Feb. 11, 1958     R. H. GERLACH     2,823,108
PROCESS FOR REDUCING ORES AND OXIDIC RESIDUES IN ROTARY KILN
Filed June 12, 1956     2 Sheets-Sheet 1

Inventor:
RUDOLPH H. GERLACH
By Taulmin & Taulmin
Attorneys

United States Patent Office 2,823,108
Patented Feb. 11, 1958

2,823,108

PROCESS FOR REDUCING ORES AND OXIDIC RESIDUES IN ROTARY KILN

Rudolph H. Gerlach, Bottrop, Germany, assignor to Aktiengesellschaft für Unternehmungen der Eisen- und Stahlindustrie, Essen, Germany Application June 12, 1956, Serial No. 590,982

Claims priority, application Germany June 16, 1955

9 Claims. (Cl. 75—33)

This invention relates to a process for reducing ores and oxidic residues in rotary kilns; it relates more particularly to improvements of the Krupp Direct Process of making iron from iron ores in rotary kilns.

It is an object of my invention to provide an improved process for reducing metal oxide materials in rotary kilns in which process the reduction zone in the kiln is relieved by a reduction of the workload in the same, and consequently the throughput of the kiln is increased.

It is another object of the invention to reduce the amount of flue dust from the rotary kiln in the process of reducing ores and oxidic residues.

It is a further object of the invention to provide a rotary kiln process which can be steered to obtain at will, a desired content of volatilizable metals in the resulting flue dust.

It is yet another object of the invention to provide an improved process of reducing ores and oxidic products, in which the consumption of fuel is considerably reduced.

Iron ores have already been reduced with the aid of solid carbon in a rotary kiln by means of the Krupp Direct Process whereby metallic iron is obtained in the form of nodules. The waste gases of this process escaping from the kiln carry a flue dust which contains particles of clay iron oxides and carbon particles. If the processed ores also contain zinc, lead or other metals volatilizable at the reduction temperature of iron, the oxides of these metals are also to be found in the flue dust. In the process known in the art this flue dust is separated from the waste gases, for instance by electrostatic precipitation or any other known method, and the flue dust resulting from a first charge is admixed to a following charge and thus caused to pass again through the kiln. The flue dust resulting from this second treatment is incorporated in the charge of a later cycle and so on.

The purpose of adding the flue dust of each cycle to the next following charge is to recover at least part of the oxides and carbon contained in the dust.

However, it has been found that a large portion of the flue dust added to a charge passes the kiln immediately without participating in the kiln process and is recovered substantially unchanged at the discharge end of the kiln. Consequently the amount of flue dust carried with each cycle of work is unduly and unnecessarily large.

If the aforesaid volatilizable metals such as zinc, lead, cadmium, thallium and germanium are to be recovered from the flue dust, the aforesaid increase in the amount of flue dust has the undesirable result of lowering the concentration of the oxides of these metals in the total amount of flue dust.

Another byproduct of the Krupp Direct Process is the "magnetic concentrate." This byproduct is obtained when the comminuted slag is subjected to magnetic separation. The magnetic concentrate has a grain size of two millimeters and smaller and contains from 50 to 70 percent of finely distributed iron, which is embedded in the slag particles.

It is conventional in the art to add this magnetic concentrate from one cycle to the charge of each subsequent cycle, in the same manner as described above in the case of flue dust.

The magnetic concentrate is added to the charge in order to recover the iron contained in the concentrate and to promote the formation of iron nodules.

The charge to which flue dust and/or magnetic concentrate have been added is then conventionally introduced into the rotary kiln through, for instance a hopper provided at the charge end of the rotary kiln.

Both the addition of the flue dust and the magnetic concentrate to the charge increase the workload of the rotary kiln in particular in the reduction zone and reduce the rate of throughput in an undesirable manner.

This drawback is eliminated and the above-mentioned object of my invention achieved by the steps of reintroducing the aforesaid metal-containing by-products of a processed charge which has been discharged from the kiln during a work cycle of the same i. e. flue dust, or the magnetic concentrate or both concurrently into the rotary kiln countercurrently to a new charge during a following work cycle of the kiln by way of the discharge end of the latter, i. e. by way of that end of the kiln at which for instance the fuel burners are arranged, if coaldust is to be burnt in the kiln.

This introduction of the flue dust, the magnetic concentrate, or both, countercurrently to the direction in which the charge moves through the kiln, i. e. into the discharge end of the rotary kiln during the working cycle, is of great advantage in process for the reduction of iron ores, for instance in the Krupp Direct Process. It is equally applicable with similar advantage in processes for the production of non-ferrous metals such as zinc, cadmium, lead, tin, which processes are generally referred to as "Rotary Process" (Wälzverfahren) and are described, for instance in "Lehrbuch für Metallhüttenkunde," by Viktor Tafel (1953), pages 624–628.

The invention will be better understood by the following description in combination with the accompanying drawings in which.

Figure 1:
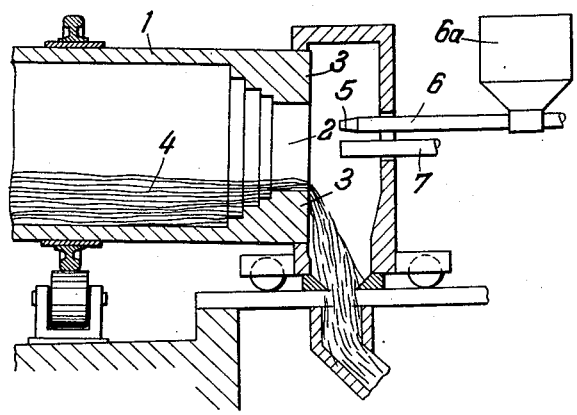
Fig. 1 shows schematically the discharge end of a rotary kiln provided with means for carrying out the process of the invention.
Figure 2:
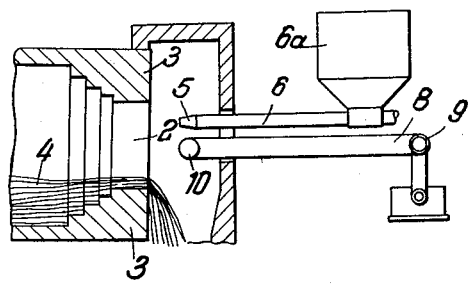
Fig. 2 shows schematically the discharge end of a rotary kiln provided with somewhat different means for the same purpose.

In these figures like numerals indicate like parts. The rotary kiln 1 is provided with a central discharge opening 2 in its front end wall 3. The kiln contains the charge 4 which is introduced through conventional charging means (not shown) at the rear end or mouth of the kiln (not shown).

The charge 4 is heated through burners 5 by means of a carbonaceous fuel blown into the kiln by way of pipes 6. These burners 5 are used simultaneously for the introduction of the flue dust into the kiln according to the improved process of my invention. The flue dust is mixed in hopper 6a with coke dust and blown with aid of compressed air into the kiln.

The magnetic concentrate is introduced into the kiln, for instance, by way of pressure line 7 (see Fig. 1). It may also be introduced by means of an endless transport belt 8 which is guided around a pulley 9 and a guide roller 10, the pulley 9 being activated by a motor and transmission 11 to move the belt 8 at sufficient speed to fling the magnetic concentrate carried on the same through the opening 2 into zone of nodule formation in the kiln. When added to this zone, the magnetic concentrate promotes the formation of nodules and contributes to a further increase in the rate of throughput of the ore through the kiln.

Figure 3:
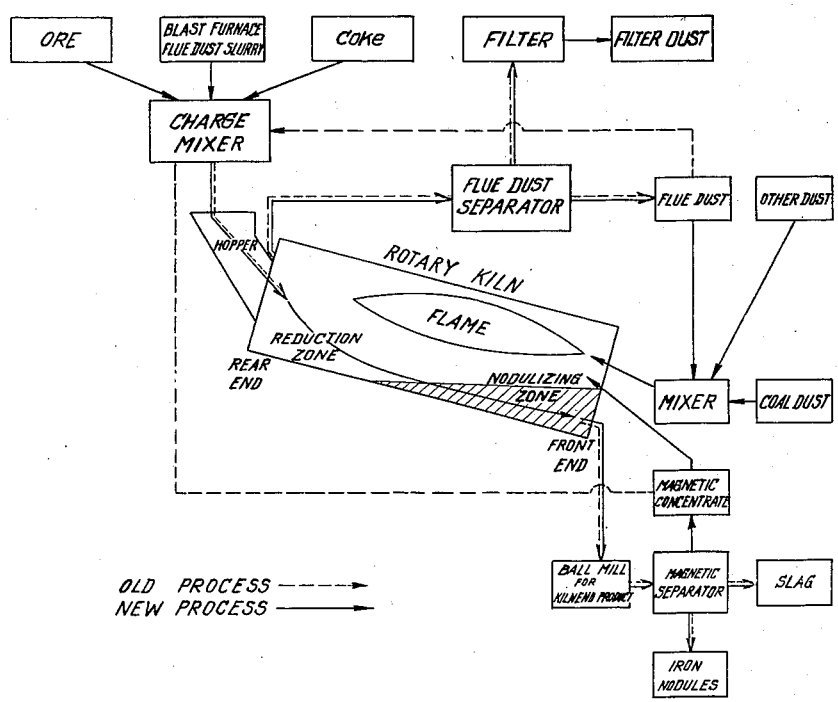
Fig. 3 is a flow sheet illustrating the work cycle of a rotary kiln including the steps according to the present invention.

The flowsheet (Fig. 3) illustrates the work cycle of a rotary kiln, beginning with the charging of the kiln, the passage of material through the latter, the separation of slag, modules and magnetic concentrate, and the separation of the flue dust from the waste gases. According to the known processes the cycle is completed as illustrated by dashed lines in the flue dust by returning the magnetic concentrate and flue dust to the rear end of the kiln and adding it to a next following charge.

According to the work cycle in the process of my invention illustrated in full lines in the flow sheet, the flue dust alone or in mixture with dust from other waste gases, for instance, from the flue gases of blast furnaces, is admixed to the carbonaceous fuel and introduced into the kiln as described hereinbefore, while the magnetic concentrate is introduced separately into the nodulizing zone of the kiln through the front (or discharge) end of the latter.

The flue dust from rotary kiln processes may contain approximately 6 to 10% of iron, 15 to 25% of zinc and/or other volatilizable metals, and about 25 to 30% of carbon particles.

It is preferred to introduce the flue dust from the next preceding work cycle of the kiln, alone or in mixture with suitable dusts from the waste gases of other metallurgical processes, such as flue dust from blast furnaces waste gases, and in particular flue dust containing zinc oxide, lead oxide, and/or oxides of other volatilizable metals into the kiln in such a manner that it is discharged into the heating flame burning in the kiln interior. This is achieved preferably by introducing the flue dust or dust mixture together with the kiln fuel, if carbon dust burners are used for heating the kiln, the flue dust or dust mixture can thus be blown into the kiln in mixture with the carbon dust fuel. Up to about 30 to 50% of the conventional amount of coal dust may be replaced by flue dust, filter dust or a mixture thereof with fine dust from blast furnaces waste gases.

When proceeding in this manner, the carbonaceous portion of the flue dust is burnt, the heat recovered therefrom permitting to reduce the amount of new carbonaceous fuel required to heat the kiln.

The iron oxide particles of the flue dust are united with the charge of the kiln and the other metal oxides are rapidly volatilized, due to the presence in the dust in the form of fine particles.

Thereby the amount of flue dust which must be reintroduced into the kiln, is greatly reduced, as will be seen in the examples given below.

Due to the reduction of the total amount of flue dust obtained from each cycle, and of the fact that the amount of oxides of volatilizable materials leaving the kiln remains substantially the same, the percentage of oxides of volatilizable metals in the flue dust resulting in the process of my invention is considerably higher. Furthermore, owing to the greater rate of throughput through the kiln it is possible to obtain a desired percentage of volatilizable metals oxide in the flue dust more rapidly than by the known processes.

The ratios, of for instance, flue dust from the rotary kiln and a dust from waste gases of another process can be chosen at will.

Thereby it is possible to steer the contact of volatilizable metals to obtain, at will, a desired percentage, for instance, of zinc oxide in the flue dust, by moving the flue dust from a proceeding kiln cycle with waste dust rich in zinc from other processes such as the zinc oxide reduction and distillation process.

As has been mentioned above the process according to the invention is thus equally applicable in the production of certain non ferrous metals such as zinc, lead, tin, cadmium, thallium, and germanium, i. e. those metals, the boiling points of which are below the reduction temperatures of their respective oxides.

The process according to the invention is further illustrated by a number of examples given below, which are, however, not meant to be limitative in any way. For the sake of comparison, a known process is illustrated by Example I.

*Example I*

A charge for the known Krupp Direct Process in a rotary kiln is prepared by mixing together:

| Material | Content of— | | |
|---|---|---|---|
| | Percent Fe | Percent Zn | Percent C |
| 65 kg. roasted pyrite | 41.50 | 9.30 | |
| 65 kg. blast furnace flue dust slurry | 30.1 | 3.0 | |
| 4.5 kg. magnetic concentrate | 70.0 | | 6.6 |
| 9 kg. flue dust from a preceding run | 8 | 20 | 28 |
| 50 kg. small coke or coke breeze | | | |

This charge is introduced into the rotary kiln illustrated in the flowsheet through the hopper at the rear end of the kiln. About 25 kilograms of fine coal dust of a particle size of about 0.1 millimeter are blown through the burner at the front end of the kiln and burnt during the same period.

The discharged slag and iron nodules are separated and the slag processed to recover therefrom about 4.5 kilograms of magnetic concentrate which is reincorporated in the next following cycle, or stored in a silo for future runs.

From the waste gases of the kiln, 9 kg. of flue dust are recovered in the dust separating chambers. This flue dust is reincorporated in a next following cycle of the kiln by adding it to the charge, as is indicated by the dashed lines in the flowsheet.

The waste gases from the rotary kiln which have been freed from flue dust in the above mentioned separators, are then passed through filters in which approximately 9 kilograms of a firm filter dust is recovered which had a content of: 31.2% Zn, 27.5% C, and 6.1% Fe.

*Example II*

After a starting charge having the same composition as that of Example I has been processed in the same manner through a rotary kiln, and 9 kg. of flue dust have been recovered, the next following charge is prepared as follows:

| Material | Content of— | | |
|---|---|---|---|
| | Percent Fe | Percent Zn | Percent C |
| 65 kg. roasted pyrite | 41.50 | 9.30 | |
| 65 kg. blast furnace flue dust slurry | 30.1 | 3.0 | |
| 4.5 kg. magnetic concentrate | 70.0 | | 6.6 |
| 50 kg. of small coke or coke breeze | | | |

This charge is processed through the rotary kiln by introducing it at the rear end of the latter. At the same time the 9 kg. of recovered flue dust in mixture with 20 kg. of coal dust are blown into the kiln through the burners at the front end of the same. The flue dust recovered in the dust separation chambers after this work cycle is less than 9 kg. and, after three or four more cycles, each of about 4 hours' duration, the amount of recovered flue dust remains constant at about 5 kg., or about 45% less than is recovered from the conventional process.

The carbon content of the flue dust permits to use only 20 kg. of coal dust for the burner mixture instead of 25 kg. required in the conventional process of Example I.

While the amount of flue dust is thus greatly reduced, the filter dust recovered from the waste gases leaving the dust separator which dust amounts to about 5 kg., has a content of: 50.3% Zn, 6.6% C, and 5.1% Fe.

*Example III*

After having started the work cycles in a rotary kiln in the same way as in Example II, the second charge is prepared by mixing together:

69.5 kg. roasted pyrite
65 kg. blast furnace flue dust slurry, and
50 kg. of coke breeze which are introduced into the rotary kiln (see flow sheet) at the rear end thereof. The flue dust in the amount of 9 kg. for the second cycle, and less amounts decreasing to a constant 5 kg. for the subsequent cycles is mixed with 20 kg. of coal dust and blown into the burners at the front end of the kiln.

At the same time 4.5 kg. magnetic concentrate recovered from the first cycle are also blown into the kiln through a separate conduit introduced through the front end of the kiln.

The fact that this amount of magnetic concentrate is not introduced in the charge through the rear end of the kiln permits to raise the total quantity of roasted pyrite in the charge by the same amount. This increased amount of roasted pyrite is processed in the kiln without difficulty.

*Example IV*

After having started the work cycles in a rotary kiln in the same manner as in Example II, the second and following charges are also processed as described in the aforesaid example. However, the mixture which is blown through the burners at the front end of the kiln after the flue dust amount has grown constant is composed as follows:

5 kg. flue dust
5 kg. filter dust from a preceding kiln cycle and having a zinc content of 50%
20 kg. of coal dust The filter dust resulting from the following cycle has a higher zinc content of about 50%, which can be further increased by repeatedly passing the filter dust through the kiln together with the mixture of flue dust and fuel.

*Example V*

The work cycle in a rotary kiln is started in the manner described in Example II and continued until the flue dust recovered after each cycle is constant at about 5 kg.

However, the mixture which is blown during each cycle through the burners at the front end of the kiln is composed as follows:

5 kg. flue dust from a preceding cycle
5 kg. fine dust from waste gases of a blast furnace, which dust has a particle size below 0.1 millimeter and a content of volatilizable metals of about 7.5%
20 kg. coal dust The resulting filter dust in the amount of 7 kg. has a content of volatilizable metals of about 43%.

*Example VI*

The process according to the invention is carried out as described in Example V. However, the fine dust from blast furnace waste gases in the mixture to be blown through the burners of the rotary kiln is replaced by the same amount of fine grained waste products of a zinc distilling plant having a relatively high content of cadmium and thallium.

The resulting filter dust is rich in cadmium. By repeating the whole cycle several times in the same manner a filter dust having a content of about 50% of volatilizable metals is obtained of what the major portion consists of cadmium.

*Example VII*

The process according to the invention is carried out as described in Example V. However, the fine dust from blast furnace waste gases is replaced by a fine-grained coke ash rich in germanium. By repeating several times the work cycles, with the resulting flue dust and filter dust being reintroduced in the mixture with coal dust through burners at the front end of the kiln, a filter dust is finally obtained (after, for instance, six cycles) which has a content of about 50% of volatilizable metals the major portion of which consists of germanium.

What I claim is:

1. In the Krupp Direct Smelting Process of reducing a charge of ores and metals oxide containing residues of metallurgical processes in a rotary kiln, the step of reintroducing the metal-containing by-products discharged from a work cycle of the rotary kiln in said Krupp Direct Smelting Process into a following work cycle by introducing them into the kiln countercurrently to the charge.

2. In a process of reducing a charge of iron oxide and other metal-oxide containing materials in a rotary kiln, the step of reintroducing at least one of the by-products discharged from a work cycle of the rotary kiln, which by-products consist of flue dust and magnetic concentrate, into a following work cycle in the same direction as the carbonaceous fuel burnt to form the heating flame in said kiln, and in countercurrent to the direction of said charging passing therethrough.

3. The process step as described in claim 2 characterized in that the carbonaceous portion of said flue dust is burnt in said flame.

4. The process step as described in claim 2 characterized in that said magnetic concentrate is incorporated in the reaction mass inside said kiln in the nodulizing zone thereof.

5. A process of reducing in a rotary kiln, ores and waste materials containing iron and metals which are volatazable at the reduction temperature of iron, comprising the steps of introducing a charge comprising said ores and waste materials into said kiln, processing said charge successively in a reduction zone and a nodulizing zone of said kiln so as to reduce said ores and nodulize the resultant iron therein, recovering the flue dust containing said volatilizable metals at least partly in oxidic form from the waste gases leaving said kiln and reintroducing said flue dust in mixture with the carbonaceous fuel to form the heating flame in said kiln in countercurrent to the direction of passage of said charge through said kiln.

6. A process of reducing in a rotary kiln ores and waste materials containing iron and metals volatilizable at the reduction temperature of iron, comprising the steps of introducing a charge comprising said ores and waste materials into said kiln, processing said charge under reduction of said ores and waste materials therein while passing the same through said kiln, recovering the flue dust from the waste gases leaving said kiln, mixing said flue dust with fine dust from waste gases of other metallurgic processes, and with fine-grained carbonaceous fuel, blowing the resulting mixture into said kiln in a direction opposite to the direction in which said charge passes therethrough and burning said mixture to form the heating flame in said kiln.

7. A process of reducing in a rotary kiln ores and waste materials containing iron and metals volatilizable at the reduction temperature of iron, comprising the steps of introducing a charge comprising said ores and waste materials into said kiln, processing said charge under reduction of said ores and waste materials therein while passing the same through said kiln, recovering the flue dust from the waste gases leaving said kiln, mixing said flue dust with fine dust from waste gases of other metallurgic processes, said fine dust having a particle size of about 0.1 millimeter and containing metals volatilizable at up to the reduction temperature of iron and with fine grained carbonaceous fuel, blowing the resulting mixture into said kiln in a direction opposite to the direction in which said charge passes therethrough and burning said mixture to form the heating flame in said kiln.

8. In a process of reducing metal oxide containing materials in a rotary kiln, the steps of reintroducing the metal-containing by-products discharged from the rotary kiln by introducing them into the kiln countercurrently to the charge passing therethrough, and concurrently therewith reducing the metal oxide containing materials in said charge in said rotary kiln.

9. In a process of reducing iron oxide containing materials in a rotary kiln, the steps of reintroducing at least one of the by-products discharged from the rotary kiln, which by-products consist of flue dust and magnetic concentrate, into the kiln in countercurrent to the direction of the charge passing therethrough, and concurrently therewith reducing the metal oxide containing materials in said charge in said rotary kiln.

References Cited in the file of this patent

UNITED STATES PATENTS

| | | |
|---|---|---|
| 792,449 | Pohl | June 13, 1905 |
| 1,350,419 | Morrison | Aug. 24, 1920 |
| 1,866,203 | Folliet et al. | July 5, 1932 |

FOREIGN PATENTS

| | | |
|---|---|---|
| 841,460 | France | Feb. 6, 1939 |